Feb. 14, 1928.
R. R. STITT ET AL
1,659,058
THERMOSTATIC SWITCH
Filed May 1, 1924
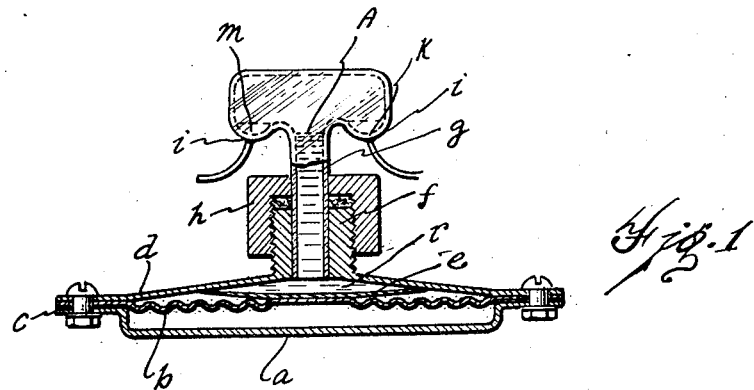
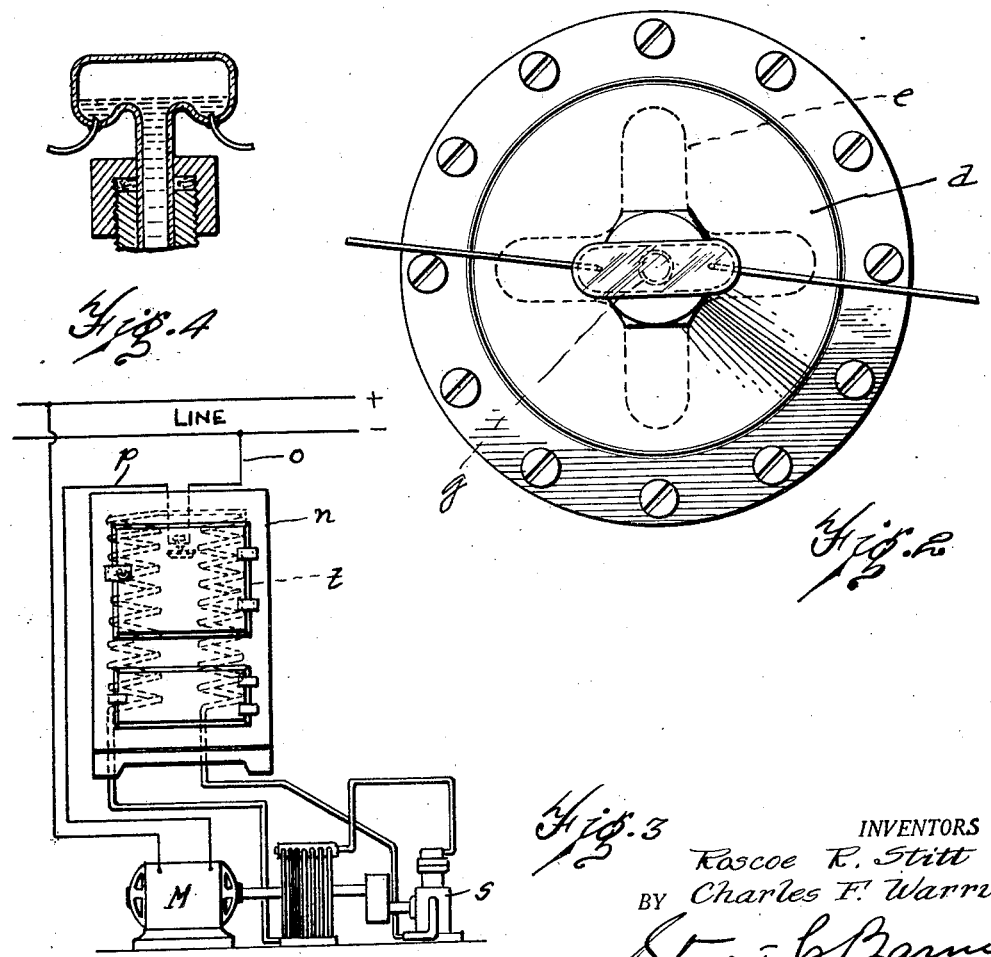
INVENTORS
Roscoe R. Stitt
BY Charles F. Warrick
Stuart C. Barnes
ATTORNEY.

Patented Feb. 14, 1928.

1,659,058

UNITED STATES PATENT OFFICE.

ROSCOE R. STITT AND CHARLES F. WARRICK, OF DETROIT, MICHIGAN, ASSIGNORS TO STITT REFRIGERATION COMPANY.

THERMOSTATIC SWITCH.

Application filed May 1, 1924. Serial No. 710,325.

This invention relates to a thermostatic switch adapted to make or break an electrical circuit in accordance with temperature changes.

One object of the invention is to provide means, whereby a liquid which possesses the property of conducting an electric current is arranged to rise or fall in a standpipe to close a gap between two electrical contacts when it reaches a predetermined high level and which will open the gap between the contacts as the level falls.

In the drawings:

Fig. 1 is a vertical sectional view through the thermostatic switch.

Fig. 2 is a plan view thereof.

Fig. 3 is a diagrammatic view showing our switch in use in a refrigerator system, whereby the rise and fall of the temperature controls the operation of the power driven refrigerating apparatus.

Fig. 4 is a detailed sectional view of the upper portion of the standpipe showing the conducting liquid closing the gap between the contacts.

Our thermostatic switch consists of a flat cup-shaped member $a$ which is covered with the flexible diaphragm $b$ and an expansible fluid is contained within the cup-shaped member and confined therein by the diaphragm. The joint between the diaphragm and the member $a$ is sealed by a suitable gasket $c$ and the cover $d$ is bolted to the member $a$ and pinches the periphery of the diaphragm therebetween against the gasket to provide a sealed container and to prevent the expansible fluid from leaking out. The cover $d$ is slightly convex in cross section so as to provide a reservoir $r$ between the diaphragm and the cover, and a spring $e$ of the shape shown in Fig. 2, substantially a cross, is interposed between the diaphragm $b$ and the cover. The cover $d$ is provided with a central boss $f$ which has a central opening therethrough in which is secured a standpipe $g$ of glass or other insulating material. The exterior of the boss is screw-threaded and a packing nut $h$ is screwed thereon for preventing leakage around the standpipe. This standpipe is provided with an enlarged upper end in which are located a pair of wells $i$ and the contact points $k$ and $m$ are each located in one of these wells. Mercury, or some other liquid which has the property of conducting an electric current, is contained within the reservoir between the diaphragm and the cover $d$, and normally rises in the standpipe to a level designated A. It is plainly seen that there is a gap between the two electrical contact points thereby breaking the electrical circuit.

This switch is adapted to be located in a refrigerator $n$, the conductors $o$ and $p$ connected to the contact points $k$ and $m$ respectively. These conductors connect the motor M to the main power line, and when the gap exists between the separated contact points the circuit through the motor is open. As the temperature in the refrigerator rises, the expansible fluid contained below the diaphragm will expand, thereby raising the flexible diaphragm and decreasing the capacity of the reservoir $r$ between the diaphragm and the cover $d$. This will cause the level of the mercury or conducting fluid in the standpipe to rise and overflow into the wells $i$ situated in the enlarged head portion of the standpipe, as shown in Fig. 4. This will close the gap between the contacts and the electrical current passes from one contact to the other through the mercury or conducting liquid, thereby closing the circuit through the motor and starting the same, which will drive the compressor $s$ and force the refrigerant through the coils $t$ in the refrigerator, thereby cooling the same and causing the level of the mercury in the standpipe to fall. When the refrigerator has been sufficiently cooled, the mercury recedes and again establishes a gap between the contacts thereby shutting off the motor.

What we claim is:

1. A thermostatic switch comprisng a vessel, a diaphragm dividing the vessel into the two chambers, fluid in one of the chambers which expands and contracts with temperature changes, an electrical conducting fluid in the other chamber, a tube having a closed end and an open end mounted in the wall of the vessel with its open end communicating with the chamber containing the conducting fluid, the closed end of the tube being enlarged and shaped to provide wells, and electrical terminals located in these wells, the conducting fluid being caused to rise in the tube and overflow into the wells upon the expansion of the first mentioned fluid to make an electrical connection between the terminals and to recede in the tube upon contraction of the first mentioned fluid to break such electrical connection.

2. A thermostatic switch comprising a vessel, a diaphragm dividing the vessel into the two chambers, a fluid in one of the chambers which expands and contracts with temperature changes, an electrical conducting fluid in the other chamber, means normally pressing the diaphragm towards the chamber containing the expansible fluid, a tube mounted in the wall of the vessel and communicating with the chamber containing the conducting fluid, and spaced electrical terminals in the tube, the conducting fluid being caused to rise and recede in the tube upon expansion and contraction of the first mentioned fluid to make and break the electrical connection between the terminals.

3. A thermostatic switch comprising a vessel, a diaphragm dividing the vessel into two chambers, fluid in one of the chambers which expands and contracts with temperature changes, an electrical conducting fluid in the other chamber, a tube having a closed end and an open end mounted in the wall of the vessel with its open end communicating with the chamber containing the conducting fluid, said tube being shaped to provide a well for holding a quantity of the conducting fluid, and electrical terminals located in the well, the conducting fluid being caused to rise in the tube and overflow into the well upon expansion of the first mentioned fluid to make an electrical connection and to recede in the tube upon contraction of the first mentioned fluid to break such electrical connection.

In testimony whereof we have affixed our signatures.

ROSCOE R. STITT.
CHARLES F. WARRICK.